(12) United States Patent
Johnston et al.

(10) Patent No.: US 9,797,783 B2
(45) Date of Patent: Oct. 24, 2017

(54) FILTER AND METHOD AND DISTRIBUTED TEMPERATURE SENSOR SYSTEM

(71) Applicants: William Albert Johnston, Houston, TX (US); Ian Mitchell, Richmond, TX (US)

(72) Inventors: William Albert Johnston, Houston, TX (US); Ian Mitchell, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 15/159,414

(22) Filed: May 19, 2016

(65) Prior Publication Data

US 2016/0370235 A1 Dec. 22, 2016

Related U.S. Application Data

(60) Provisional application No. 62/180,697, filed on Jun. 17, 2015.

(51) Int. Cl.
*G01K 11/32* (2006.01)
*G02B 6/02* (2006.01)

(52) U.S. Cl.
CPC ........ *G01K 11/32* (2013.01); *G02B 6/02052* (2013.01)

(58) Field of Classification Search
CPC .................... G02B 6/02052; G01K 11/32
See application file for complete search history.

(56) References Cited

U.S. PATENT DOCUMENTS

| 2008/0253428 | A1 | 10/2008 | MacDougall et al. |
| 2012/0147924 | A1 | 6/2012 | Hall |
| 2014/0158877 | A1 | 6/2014 | Wysocki et al. |
| 2016/0185649 | A1* | 6/2016 | Gonnet ............ C03B 37/01291 428/389 |

OTHER PUBLICATIONS

Lee, Chung E.; "Fiber-optic sensing: Self-calibrating technique enables long-distance temperature sensing"; Laser Focus World, Jan. 8, 2007, 9 pages.
Notification of Transmittal of the International Search Report and the Written Opinion of the International Searching Authority, or the Declaration; PCT/US2016/032450; dated Aug. 29, 2016; 9 pages.
Sebastien Loranger, et al.; "Rayleigh scatter based order of magnitude increase in distributed temperature and strain sensing by simple UV exporsure of optical fibre"; Scientific Reports, Jun. 16, 2015, see p. 1, 7 pages.

* cited by examiner

*Primary Examiner* — John M Bedtelyon
(74) *Attorney, Agent, or Firm* — Cantor Colburn LLP

(57) ABSTRACT

A distributed temperature sensor (DTS) system includes a light source; a length of fiber filter having been hydrogen darkened prior to assembly of the system; and a DTS fiber. A method for making a filter for a DTS system.

13 Claims, 1 Drawing Sheet

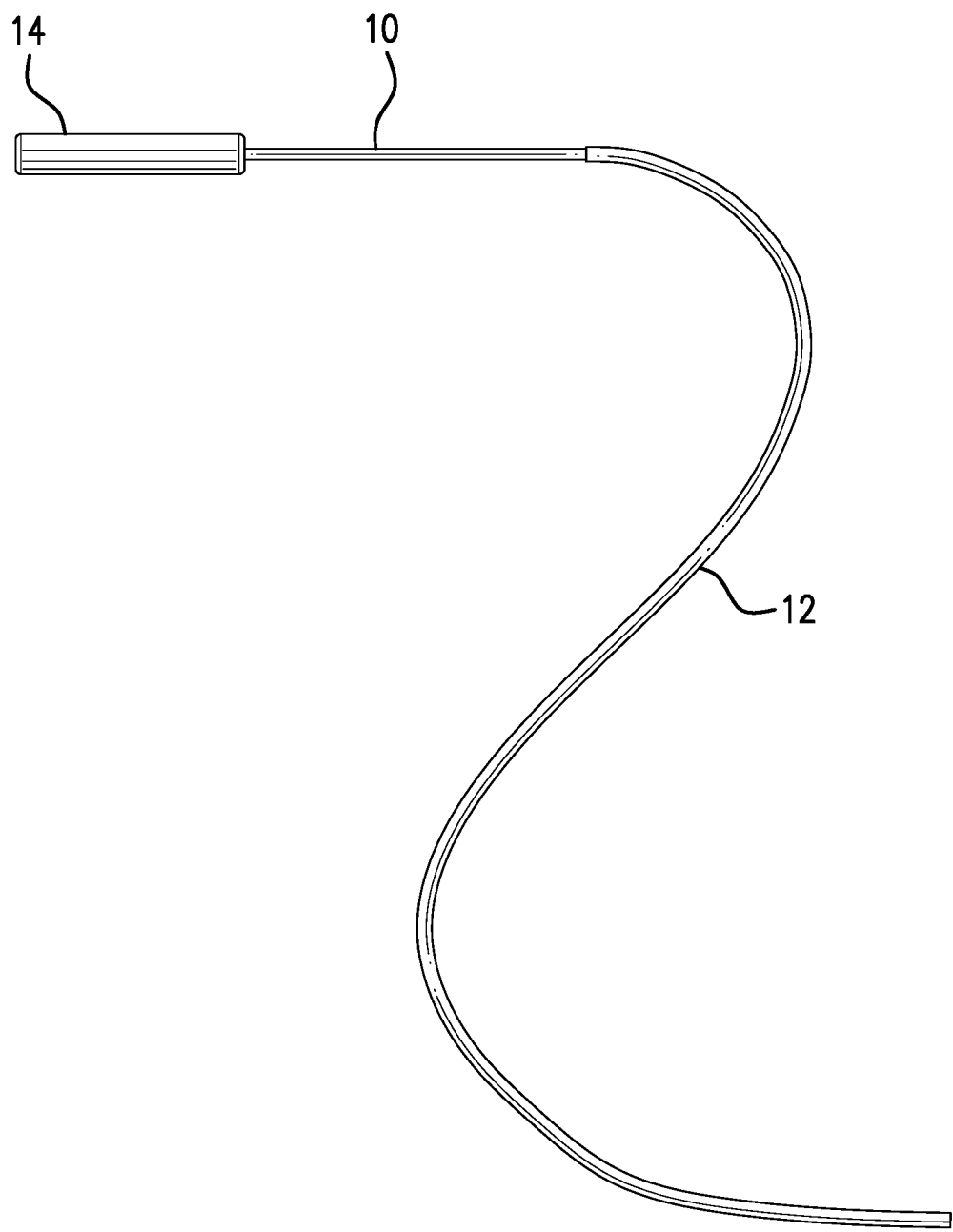

FILTER AND METHOD AND DISTRIBUTED TEMPERATURE SENSOR SYSTEM

CROSS REFERENCE TO RELATED APPLICATIONS

This application claims the benefit of an earlier filing date from U.S. Provisional Application Ser. No. 62/180,697 filed Jun. 17, 2015, the entire disclosure of which is incorporated herein by reference.

BACKGROUND

In the drilling and completion industry, fiber optic cables and sensors have become very important in maximizing efficiency in all phases of well construction and development. Real time information provided by the fibers allows operators to make prescient decisions that reduce errors and delays. Fiber has been growing in use for at least a decade and now can be found in many downhole tools and systems.

While the industry is generally enamored of pursuing the use of fiber, there are still issues surrounding its use that are detractors. For example, hydrogen darkening is an issue that has plagued the industry for years, particularly with respect to Distributed Temperature Sensor (DTS) arrangements operated in a single end mode. This is because Raman scattered light has a very wavelength dependent absorption spectrum. Since different components of the Raman signals get attenuated at different rates, the temperature traces computed from the Raman scatter data contain artifacts due to the hydrogen absorption features. Efforts have been made to render the fiber resistant to hydrogen infiltration to alleviate these effects but the previously tried measures have only been partially effective. When darkening occurs, stokes wavelengths are unaffected while antistokes wavelengths are inconsistently affected. This results in readings that are unreliable. Despite the efforts noted above, the problem persists. The art would welcome alternative approaches that render use of fiber more reliable in such circumstances.

BRIEF DESCRIPTION

A distributed temperature sensor (DTS) system includes a light source; a length of fiber filter having been hydrogen darkened prior to assembly of the system; and a DTS fiber.

A filter for a distributed temperature sensor system includes a length of fiber filter darkened by exposure to a high hydrogen and high temperature environment to selectively filter selected wavelengths of light from light passing therethrough.

A method for making a filter for a DTS system includes securing a length of fiber; exposing the length of fiber to a high hydrogen and high temperature environment for a period of time.

BRIEF DESCRIPTION OF THE DRAWINGS

The following descriptions should not be considered limiting in any way. With reference to the accompanying drawings, like elements are numbered alike:

The FIGURE is a schematic representation of a fiber optic system configured as disclosed herein.

DETAILED DESCRIPTION

A detailed description of one or more embodiments of the disclosed apparatus and method are presented herein by way of exemplification and not limitation with reference to the FIGURE.

Referring to the FIGURE, a system for DTS is disclosed that includes a filter 10 in operable communication with an optic fiber cable 12 such as a DTS cable. Also in operable communication with the filter is a light source 14 such as a laser. In an embodiment, the laser produces light having a wavelength of from 1500 nanometers to 1600 nanometers. Operable communication in the context of this disclosure means that sufficient light passes between the source and the filter and the fiber such that interrogation wavelengths may be imposed on the system and responsive wavelengths may be monitored to allow the system to have utility for DTS.

The filter 10 is configured from a length of optic fiber. While it is to be understood that other glass configurations such as a block of glass could be substituted for the filter 10, it would be more difficult to achieve the optical path length and hence would be less desirable. Such other configurations are however contemplated within the disclosure hereof. In one embodiment, the fiber is of the same type that will be used downhole. However, it is to be understood that any Germania-free harsh environment fiber chemistry may be used. This is because, the hydrogen induced attenuation vs wavelength is similar enough among all harsh environment fibers that it is possible to mix and match different harsh environment fibers to construct a system using the filter as described herein and another harsh environment fiber. The length of optic fiber is exposed to a high hydrogen and high temperature environment for a period of time sufficient to cause hydrogen darkening of the length of fiber. The high temperature would be up to about 250 C. And while pressure may also be varied, it has been determined that atmospheric pressure with pure hydrogen. Pressurizing the hydrogen to which the fiber is exposed increases the rate of darkening and also increases the total amount of darkening of the length of fiber. Clearly, increasing the speed of filter preparation can be of benefit in some instances but consideration must be given to the intended environment of storage and use of the fiber filter. Specifically, where a fiber is darkened at greater than atmospheric pressure it must be stored and used at greater than atmospheric pressure because once the fiber returns to atmospheric pressure the extra hydrogen associated with the additional darkening can diffuse out of the fiber. This can in some cases lead to time dependent changes in optical characteristics. Unclear optical response is undesirable. In the case of DTS interrogators, since they commonly will operate at room temperature and pressure the preparation of the fiber filter would normally be carried out at room temperature and atmospheric pressure. Time of exposure ranges from about 1 hour to about 1 week depending upon the source used. Temperatures that are productive range from about 25 C to about 250 C. The length of fiber may have an overall length of from about 1 m to about 100 m. In one embodiment the filter 10 length of fiber is about one meter in length. This darkened fiber is employed as filter 10 to remove the wavelengths that are subject to attenuation in the DTS fiber as that fiber is hydrogen darkened over time. By removing the wavelengths that are subject to attenuation prior to even entering the actual DTS fiber, there is no anomalous activity in the DTS fiber and accordingly the results of interrogation are more reliable.

In one embodiment, the darkened filter 10 is configured to filter antistokes wavelengths that experience disruption. In one example, where a 1550 nanometer source is used, the filter 10 is configured to remove antistokes wavelengths in a band centered at about 1385 nanometers (example target). The band may be from 10 to 50 nanometers above and below the target wavelength or in another embodiment may be in a band of about 20-about 40 nanometers above and below the target wavelength. Simulations have revealed that a DTS system built as described above will reduce artifacts by a factor of 7, resulting in significantly higher quality data.

Set forth below are some embodiments of the foregoing disclosure:

Embodiment 1

A distributed temperature sensor (DTS) system comprising: a light source; a length of fiber filter having been hydrogen darkened prior to assembly of the system; and a DTS fiber.

Embodiment 2

The system in any of the preceding embodiments, wherein the light source is a laser.

Embodiment 3

The system in any of the preceding embodiments, wherein the laser generates light in a range of 1500 to 1600 nanometers in wavelength.

Embodiment 4

The system in any of the preceding embodiments, wherein the length of fiber filter is about 1 m to about 100 m in length.

Embodiment 5

The system in any of the preceding embodiments, wherein the length of fiber filter is about 1 meter in length.

Embodiment 6

The system in any of the preceding embodiments, wherein the length of fiber filter is darkened to remove wavelengths in a 10 to 50 nanometer band about a target center wavelength.

Embodiment 7

The system in any of the preceding embodiments, wherein the length of fiber filter is darkened to remove wavelengths in a 20 to 40 nanometer band about a target center wavelength.

Embodiment 8

The system in any of the preceding embodiments, wherein the target wavelength is 1385 nanometers.

Embodiment 9

A filter for a distributed temperature sensor system comprising: a length of fiber filter darkened by exposure to a high hydrogen and high temperature environment to selectively filter selected wavelengths of light from light passing therethrough.

Embodiment 10

The filter in any of the preceding embodiments, wherein the length of the length of fiber is about 1 to about 100 m.

Embodiment 11

The filter in any of the preceding embodiments, wherein the length of the fiber is about 1 meter.

Embodiment 12

The filter in any of the preceding embodiments, wherein the filter is a harsh environment fiber.

Embodiment 13

The filter in any of the preceding embodiments, wherein the filter is a Germania-free fiber.

Embodiment 14

A method for making a filter for a DTS system comprising: securing a length of fiber; exposing the length of fiber to a high hydrogen and high temperature environment for a period of time.

Embodiment 15

The method in any of the preceding embodiments, wherein the length of fiber is Germania-free.

Embodiment 16

The method in any of the preceding embodiments, wherein the exposing is to an environment of pure hydrogen.

Embodiment 17

The method in any of the preceding embodiments wherein the temperature is about 25 degrees C. to about 250 degrees C.

Embodiment 18

The method in any of the preceding embodiments wherein the exposing is for about 1 hour to about 1 week.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A distributed temperature sensor (DTS) system comprising:
   a light source;
   a length of fiber filter having been hydrogen darkened prior to assembly of the system connected to the light source; and
   a DTS fiber connected to the filter.

2. The system as claimed in claim 1 wherein the light source is a laser.

3. The system as claimed in claim 2 wherein the laser generates light in a range of 1500 to 1600 nanometers in wavelength.

4. The system as claimed in claim 1 wherein the length of fiber filter is about 1 m to about 100 m in length.

5. The system as claimed in claim 1 wherein the length of fiber filter is about 1 meter in length.

6. The system as claimed in claim 1 wherein the length of fiber filter is darkened to remove wavelengths in a 10 to 50 nanometer band about a target center wavelength.

7. The system as claimed in claim 6 wherein the target wavelength is 1385 nanometers.

8. The system as claimed in claim 1 wherein the length of fiber filter is darkened to remove wavelengths in a 20 to 40 nanometer band about a target center wavelength.

9. A method for making a DTS system comprising:
   securing a length of fiber having two ends;
   exposing the length of fiber to a high hydrogen and high temperature environment for a period of time,
   connecting one end of the length of fiber to a light source;
   connecting an opposite end of the length of fiber to a distributed temperature sensor fiber.

10. The method as claimed in claim 9 wherein the length of fiber is Germania-free.

11. The method as claimed in claim 9 wherein the exposing is to an environment of pure hydrogen.

12. The method as claimed in claim 9 wherein the temperature is about 25 degrees C. to about 250 degrees C.

13. The method as claimed in claim 9 wherein the exposing is for about 1 hour to about 1 week.

* * * * *